(12) United States Patent
Borra et al.

(10) Patent No.: US 12,219,680 B2
(45) Date of Patent: Feb. 4, 2025

(54) CONTROLLER FOR MAPPING A LIGHT SCENE ONTO A PLURALITY OF LIGHTING UNITS AND A METHOD THEREOF

(71) Applicant: SIGNIFY HOLDING B.V., Eindhoven (NL)

(72) Inventors: Tobias Borra, Rijswijk (NL); Dzmitry Viktorovich Aliakseyeu, Eindhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 155 days.

(21) Appl. No.: 18/023,802

(22) PCT Filed: Aug. 20, 2021

(86) PCT No.: PCT/EP2021/073165
§ 371 (c)(1),
(2) Date: Feb. 28, 2023

(87) PCT Pub. No.: WO2022/043220
PCT Pub. Date: Mar. 3, 2022

(65) Prior Publication Data
US 2023/0319963 A1 Oct. 5, 2023

(30) Foreign Application Priority Data
Aug. 31, 2020 (EP) ..................................... 20193538

(51) Int. Cl.
*H05B 47/19* (2020.01)
*H05B 47/115* (2020.01)
*H05B 47/155* (2020.01)

(52) U.S. Cl.
CPC ......... *H05B 47/115* (2020.01); *H05B 47/155* (2020.01); *H05B 47/19* (2020.01)

(58) Field of Classification Search
CPC ...... H05B 45/20; H05B 47/19; H05B 47/105; H05B 47/115; H05B 47/155; H05B 47/175
See application file for complete search history.

(56) References Cited

U.S. PATENT DOCUMENTS

| | | | | |
|---|---|---|---|---|
| 7,967,652 B2 * | 6/2011 | Emerson | ............. | H01L 25/0753 |
| | | | | 313/506 |
| 8,791,642 B2 * | 7/2014 | van de Ven | ............ | H05B 45/20 |
| | | | | 315/192 |

(Continued)

FOREIGN PATENT DOCUMENTS

| GB | 2501237 A | 10/2013 |
|---|---|---|
| WO | 2012131544 A1 | 10/2012 |
| WO | 2016019005 A1 | 2/2016 |

*Primary Examiner* — Tung X Le (57) ABSTRACT

A method (500) of mapping a second light scene (ls2) onto a plurality of lighting units (110, 112, 114) is disclosed. The method (500) comprising: receiving (502) data indicative of a first light scene (ls1), the first light scene (ls1) comprising a plurality of first light settings (f1, f2, f3) for the plurality of lighting units (110, 112, 114), the data further comprising information indicative of which first light setting is mapped onto which lighting unit of the plurality of lighting units (110, 112, 114), analyzing (504) the first light settings (f1, f2, f3) of the first light scene (ls1) to determine one or more first light property values of one or more respective first light settings (f1, f2, f3), analyzing (506) second light settings (s1, s2, s3) of the second light scene (ls2) to determine one or more second light property values of one or more respective second light settings (s1, s2, s3), obtaining (508) a difference value, the difference value being indicative of a target level of difference between the first light scene (ls1) and the second light scene (ls2), mapping (510) the second light settings (s1, s2, s3) onto the plurality of lighting units (110, 112, 114) based on: the difference value, the one or more first light property values of respective first light settings (f1, f2, f3) and the one or more second light property values of respective second light settings (s1, s2, s3), such that a level of difference between the first light scene (ls1) and the second light scene (ls2) corresponds to the target level of difference, and controlling (512) the plurality of lighting units (110, 112, 114) to transition from the first light settings (f1, f2, f3) to the mapped second light settings (s1, s2, s3) and/or storing mapping information of the mapping of the second light settings (s1, s2, s3) onto the plurality of lighting units (110, 112, 114) in a memory (108, 118).

14 Claims, 5 Drawing Sheets

(56) References Cited

U.S. PATENT DOCUMENTS

| | | | |
|---|---|---|---|
| 9,603,218 B1 | 3/2017 | Bohler et al. | |
| 11,071,178 B2* | 7/2021 | Xiong | H05B 45/10 |
| 11,184,967 B2* | 11/2021 | Coleman | G01S 7/4815 |
| 11,240,895 B2* | 2/2022 | Qiu | H05B 45/20 |
| 2008/0013314 A1* | 1/2008 | Ashdown | H05B 45/22 |
| | | | 362/231 |
| 2008/0284348 A1* | 11/2008 | Cortenraad | H05B 45/20 |
| | | | 315/291 |
| 2010/0026206 A1 | 2/2010 | Sekulovski et al. | |
| 2010/0309016 A1* | 12/2010 | Wendt | H05B 47/155 |
| | | | 340/12.51 |
| 2012/0119670 A1 | 5/2012 | Vinkenvleugel et al. | |
| 2012/0169238 A1 | 7/2012 | Lenderink | |
| 2015/0257238 A1 | 9/2015 | Paradiso et al. | |
| 2017/0099713 A1* | 4/2017 | Perez | H05B 47/115 |
| 2018/0075714 A1 | 3/2018 | Sooch et al. | |
| 2018/0077783 A1* | 3/2018 | Sooch | H05B 45/28 |
| 2020/0214112 A1 | 7/2020 | Magielse | |

\* cited by examiner

CONTROLLER FOR MAPPING A LIGHT SCENE ONTO A PLURALITY OF LIGHTING UNITS AND A METHOD THEREOF

CROSS-REFERENCE TO PRIOR APPLICATIONS

This application is the U.S. National Phase application under 35 U.S.C. § 371 of International Application No. PCT/EP2021/073165, filed on Aug. 20, 2021, which claims the benefit of European Patent Application No. 20193538.4, filed on Aug. 31, 2020. These applications are hereby incorporated by reference herein.

FIELD OF THE INVENTION

The invention relates to a method of mapping a second light scene onto a plurality of lighting units of a lighting system in a space, and to a computer program product for executing the method. The invention further relates to a controller for mapping a second light scene onto a plurality of lighting units of a lighting system in a space

BACKGROUND

Home environments typically contain multiple controllable lighting units for creation of atmosphere, accent or task lighting. These controllable lighting units may be controlled according to a light scene via a user interface of a control device such as a smartphone, based on sensor input, based on a scheduled routine, etc. Such a light scene is typically descriptive of a plurality of light settings, which are associated with respective lighting units. If multiple lighting units have been controlled according to a first light scene, and a second light scene is to be activated, the lighting units are typically controlled by transitioning from the first light scene to the second light scene over time.

US 20180075714 A1 discloses an illumination system for readily mapping a plurality of scenes along a dim curve to form a natural show for one or more groups of LED illumination devices. Mapping can be performed using a graphical user interface on a remote controller wirelessly linked to the illumination devices. A keypad is preferably configured for button control of changes to color temperature as a function of brightness along each of the various dim curves for each of the various groups of illumination devices controlled by a corre-sponding keypad to allow momentary or persistent override and reprogram of the natural show. Modification to a scene further comprises modifications to scenes before and after the currently modified scene to provide a smoothing dim curve modification.

SUMMARY OF THE INVENTION

The inventors have realized that transitioning from a first light scene, wherein a plurality of light settings are associated with respective lighting units, to a second light scene, wherein a plurality of different light settings are associated with respective lighting units, may result in undesirable effects. It may, for example, occur that the contrast between a light setting (e.g. red light) of the first light scene that has been associated with a first lighting unit and another light setting (e.g. green) of the second light scene that has been associated with the (same) first lighting unit, is high, while the contrast between a second setting (e.g. yellow light) of the first light scene that has been associated with a second lighting unit and another second light setting (e.g. warm white light) of the second light scene that has been associated with the (same) second lighting unit, is low. This may result in that the contrast between the first light scene and the second light scene is different for different lamps. Another problem that may occur is that it may be undesirable that the contrast between the first light scene and the second light scene is either too high (or too low). It is therefore an object of the present invention to improve transitioning from a first light scene to a second light scene.

According to a first aspect of the present invention, the object is achieved by a method of mapping a second light scene onto a plurality of lighting units of a lighting system in a space, the method comprising:

receiving data indicative of a first light scene, the first light scene comprising a plurality of first light settings for the plurality of lighting units, the data further comprising information indicative of which first light setting is mapped onto which lighting unit of the plurality of lighting units,     analyzing the first light settings of the first light scene to determine one or more first light property values of one or more respective first light settings,     analyzing second light settings of the second light scene to determine one or more second light property values of one or more respective second light settings,     obtaining a difference value, the difference value being indicative of a target level of difference between the first light scene and the second light scene,     mapping the second light settings onto the plurality of lighting units based on:

the difference value, the one or more first light property values of respective first light settings and the one or more second light property values of respective second light settings, such that a level of difference between the first light scene and the second light scene corresponds to the target level of difference, and     controlling the plurality of lighting units to transition from the first light settings to the mapped second light settings, or storing mapping information of the mapping of the second light settings onto the plurality of lighting units in a memory.

The first light scene comprises a plurality of first light settings for the plurality of lighting units. The first light settings have already been mapped onto the plurality of lighting units. This (initial) mapping may be predefined, user defined, etc. The first light settings are analyzed to determine the first light property values (e.g. color points, intensities, beam properties, etc.) of the first light settings. Additionally, second light settings of a second light scene are analyzed for respective light property values. The second light scene may, for example, be a light scene that has been activated, a light scene that is scheduled to be activated, etc. In order to provide an improved transition from the first light scene to the second light scene, a difference value is obtained. This difference value is indicative of a (desired) target level of difference (e.g. a level of contrast) between the first light scene and the second light scene. The target level of difference relates of a level of difference that is perceivable for a human being. The second light settings of the second light scene are then mapped onto the lighting units based on the difference value, and based on the first and second light properties of the respective light settings of the respective light scenes. This enables mapping of the second light scene onto the lighting units such that the difference between the light scenes corresponds to (or approaches) the target level of difference, thereby providing an improved technique for transitioning from a first light scene to a second light scene.

Mapping information of the second light settings (and therewith the second light scene) may be stored in a memory, for instance for later retrieval. Additionally or alternatively, the one or more lighting units may be controlled according to the mapping.

The first light scene may be a current light scene, and the second light scene may be a subsequent light scene. The method may further comprise: receiving a signal indicative of an activation of the subsequent light scene. The steps of the above-mentioned method may be executed upon receiving the signal, which may be beneficial because computing resources are only used when necessary. Alternatively, the steps of the method may have already been executed for the second light scene, and the mapping information may already have been stored in the memory, which may be beneficial because it may allow an immediate transition from the first light scene to the second light scene. The signal may, for example, be a sensor signal, a timer signal, a user input received via a user interface, etc.

The target level of difference may indicate a minimal difference between the first light scene and the second light scene, and the mapping of the second light settings onto the lighting units may be performed such that the level of difference between the first light scene and the second light scene is minimized. For certain contexts, it may be beneficial if the difference (e.g. the contrast) between the first light scene and the second light scene is low. Alternatively, the target level of difference may indicate a maximal difference between the first light scene and the second light scene, and the mapping of the second light settings onto the lighting units may be performed such that the level of difference between the first light scene and the second light scene is maximized. For certain contexts, it may be beneficial if the difference (e.g. the contrast) between the first light scene and the second light scene is high.

The method may further comprise: obtaining an initial mapping of the second light settings onto the plurality of lighting units, and wherein the step of mapping the second light settings comprises remapping the second light settings onto the plurality of lighting units such that the target level of difference between the first light scene and the second light scene corresponds to the difference value. The second light scene may already have been mapped onto the plurality of lighting units. The second light scene may be remapped onto the plurality of lighting units to achieve the target level of difference.

The method may further comprise: determining a duration for transitioning from the first light settings to the mapped second light settings based on the difference value, the one or more first light property values of respective first light settings and the one or more second light property values of respective second light settings. The method may further comprise: determining to what extent (degree) the target level of difference can be achieved based on the differences between the already mapped first and the to-be-mapped second light settings, and the duration may be determined based on to what extent (degree) the target level of difference can be achieved. If the target level of difference cannot be achieved, the duration of the transition from the first light settings to the second light settings may be adjusted appropriately (e.g. increased or decreased). This is beneficial because by increasing the duration of the transition the perceived contrast can be decreased, and by decreasing the duration of the transition the perceived contrast can be increased.

The method may further comprise: obtaining position information indicative of a location and/or an orientation of a user relative to the plurality of lighting units, and the mapping of the second light settings onto the plurality of lighting units may be further based on the location and/or the orientation of the user relative to the plurality of lighting units. If, for example, a certain lighting unit (or its light effect) is further away from the user compared to another lighting unit, or if a certain lighting unit (or its light effect) is outside the field of view of the user, the mapping of the light settings may be such that less prominent/visible lighting units contribute less to the target level of difference compared to more prominent/visible lighting units.

The difference value may for example be user-defined, predefined or context dependent. A user may, for example, indicate, via a user interface the difference value. Alternatively, the difference value may be predefined (e.g. fixed). The difference value may for example be dependent on the context. It may for example be dependent on one or more contextual parameters. Examples of contextual parameters are the time of day, a user's activity, a user's mood, the number and/or identity of people present in the space, etc. To determine the difference value (i.e. the target level of difference between the first light scene and the second light scene) in dependence of the context is beneficial, because different contexts may require different transitions between light scenes, thereby further improving transitioning from the first light scene to the second light scene.

The method may further comprise: determining an activity of a user in the space when the second light scene is activated or when the second light scene is to be activated, and determining the difference value based on the activity of the user. The activity of the user is an example of a contextual parameter on which the difference value may be dependent. For certain activities, a lower level of difference (e.g. a lower contrast) between the first and second light scene may be required. If, for example, a user is reading a book and a subsequent light scene is activated, it may be desirable that the transition from the first to the second (new) light scene is less noticeable as compared to another activity.

The method may further comprise: obtaining a time of day when the second light scene is activated or when the second light scene is to be activated, and determining the difference value based on the time of day. The time of day is another example of a contextual parameter on which the difference value may be dependent. For a certain time (e.g. in the evening) of day a lower level of difference (e.g. a lower contrast) between the first and second light scene may be required compared to another time of day (e.g. in the morning).

The first and second light property values may be indicative of color points and/or intensity values of the respective light settings. Additionally or alternatively, the first and second light property values are indicative of properties of the beam shape, size and/or direction of the respective light settings.

According to a second aspect of the present invention, the object is achieved by a computer program product for a computing device, the computer program product comprising computer program code to perform any of the above-mentioned methods when the computer program product is run on a processing unit of the computing device.

According to a third aspect of the present invention, the object is achieved by a controller for mapping a second light scene onto a plurality of lighting units of a lighting system in a space, the controller comprising a processor for:

receiving data indicative of a first light scene, the first light scene comprising a plurality of first light settings for the plurality of lighting units, the data further comprising information indicative of which first light setting is mapped onto which lighting unit of the plurality of lighting units, analyzing the first light settings of the first light scene to determine one or more first light property values of one or more respective first light settings, analyzing second light settings of the second light scene to determine one or more second light property values of one or more respective second light settings, obtaining a difference value, the difference value being indicative of a target level of difference between the first light scene and the second light scene, mapping the second light settings onto the plurality of lighting units based on:

the difference value, the one or more first light property values of respective first light settings and the one or more second light property values of respective second light settings, such that a level of difference between the first light scene and the second light scene corresponds to the target level of difference, and controlling the plurality of lighting units to transition from the first light settings to the mapped second light settings and/or storing mapping information of the mapping of the second light settings onto the plurality of lighting units in a memory.

It should be understood that the computer program product and the controller may have similar and/or identical embodiments and advantages as the above-mentioned methods.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
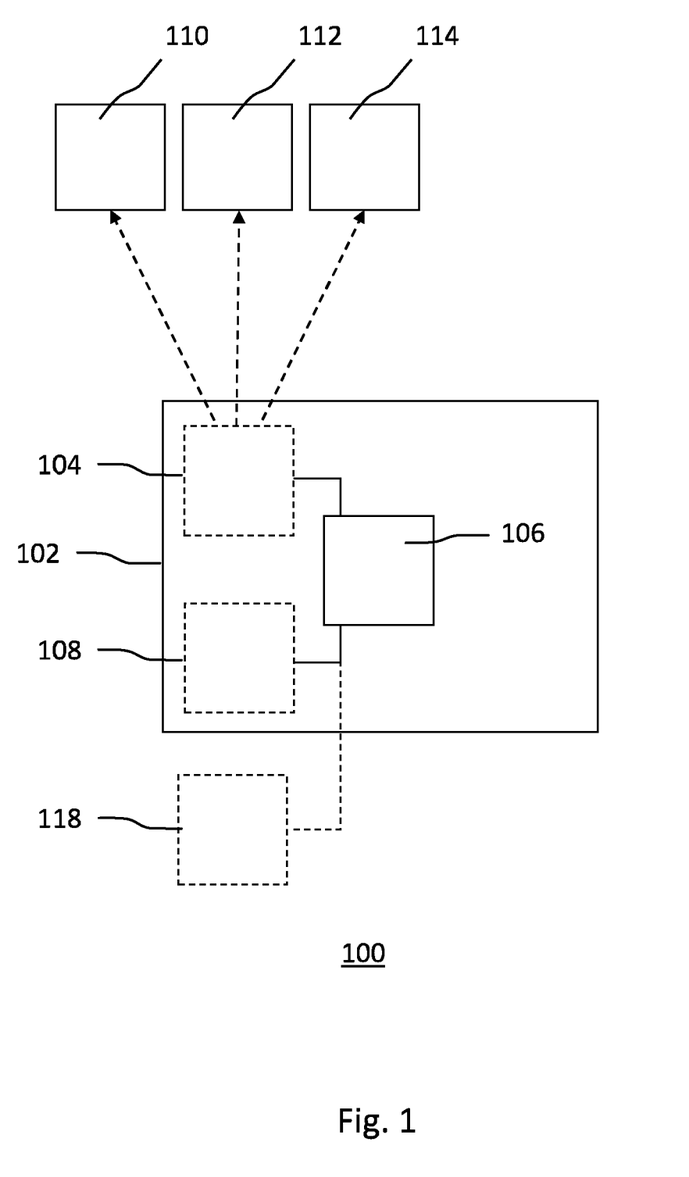
FIG. 1 shows schematically a system comprising a controller for mapping a second light scene onto a plurality of lighting units.
Figure 2A:
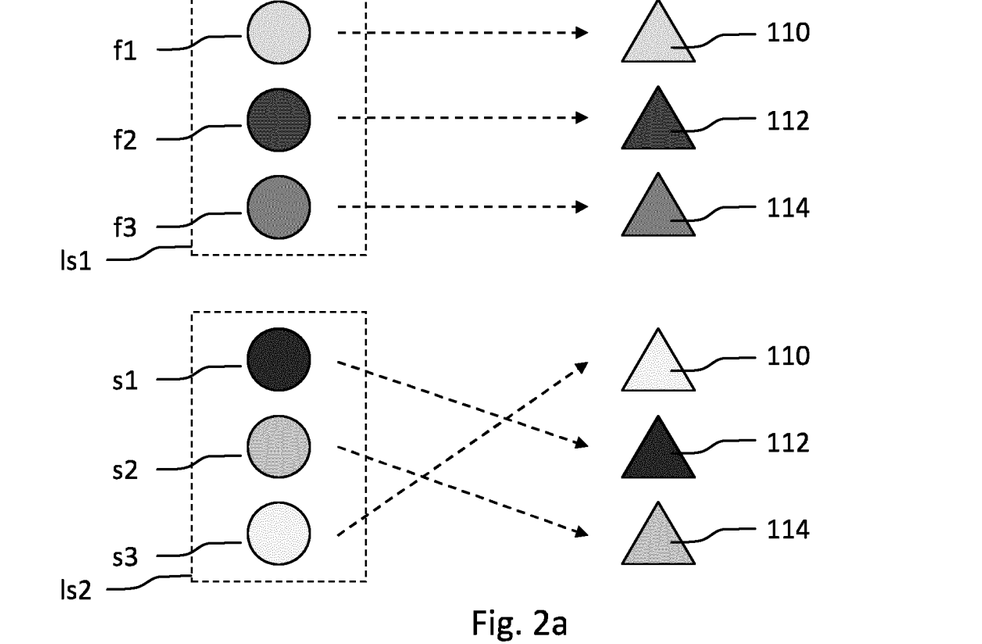
FIG. 2a shows schematically an example of a mapping of a second light scene onto a plurality of lighting units based on a difference value and a mapping of a first light scene.
Figure 2B:
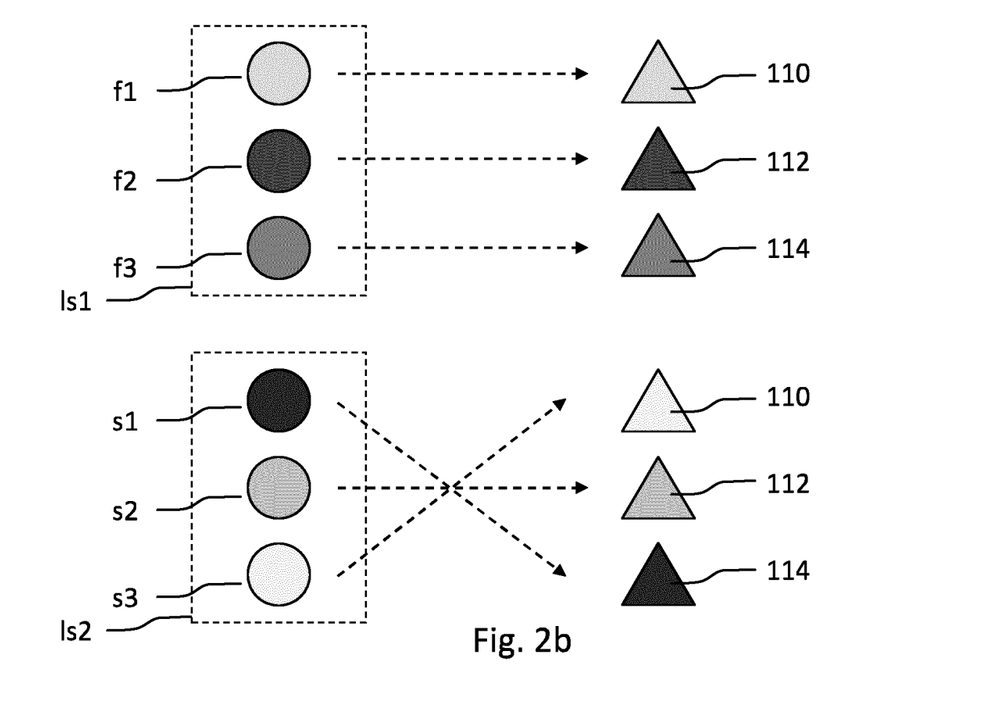
FIG. 2b shows schematically an example of a mapping of a second light scene onto a plurality of lighting units based on a different difference value and a mapping of a first light scene.

FIG. 1 shows schematically a system 100 comprising a controller 102 for mapping a second light scene onto a plurality of lighting units 110, 112, 114 of a lighting system in a space. The controller 102 comprises a processor 106 (e.g. a microcontroller, circuitry, etc.). The processor 106 is configured to receive data indicative of a first light scene, the first light scene comprising a plurality of first light settings for the plurality of lighting units, the data further comprising information indicative of which first light setting is mapped onto which lighting unit of the plurality of lighting units. At least two first light settings of the first light scene ls1 may be different light settings, or all first light settings of the first light scene ls1 may be different light settings. The first light scene may be obtained from a memory, for instance a memory 108 comprised in the controller 102, or from a remote memory 118 (e.g. a memory of a lighting control system for controlling the lighting units 110, 112, 114, a remote server accessible via the internet, etc.). FIGS. 2a and 2b illustrate examples of a first light scene ls1. In these examples, first light settings f1, f2 and f3 are associated with respective lighting units 110, 112 and 114.

The processor 106 is further configured to analyze the first light settings of the first light scene ls1 to determine one or more first light property values of one or more respective first light settings f1, f2, f3. Examples of light property values include color points (e.g. RGB values, XY color values in a color diagram such as the CIE color space, etc.), intensity values (e.g. a value from 0-100% indicating the intensity/brightness), beam shape/size/direction properties of the light settings, etc. In the examples of FIGS. 2a and 2b, the processor 106 may analyze the light settings f1, f2, f3 to determine the color properties, which may be the color points of the light settings (e.g. f1=yellow, f2=red, f3=green, as indicated in the CIE diagram of FIG. 3).

The processor 106 is further configured to obtain data of the second light scene ls2, and analyze the second light settings of the second light scene to determine one or more second light property values of one or more respective second light settings. At least two second light settings of the second light scene ls2 may be different light settings, or all second light settings of the second light scene ls2 may be different light settings. The second light scene ls2 may be a light scene that has been activated by a user, a light scene that has been activated based on a sensor input (e.g. a presence sensor, a camera, a temperature sensor, a light sensor, etc.), based on a scheduled lighting control setting (e.g. a scheduled routine or a timer), etc. In the examples of FIGS. 2a and 2b, the processor 106 may analyze the second light settings s1, s2, s3 of the second light scene ls2 to determine the color properties, which may be the color points of the second light settings (e.g. s1=purple, s2=green, s3=white, as indicated in the CIE diagram of FIG. 3).

The processor 106 is further configured to obtain a difference value. The difference value is indicative of a target level of difference between the first light scene ls1 and the second light scene ls2. The difference value may be indicative of a contrast between the first light scene and the second light scene, for instance on a scale from 0 to 100, wherein 0 may be indicative a lowest contrast (i.e. a low level of difference), and wherein 100 may be indicative of a highest contrast (i.e. a high level of difference). The target level of difference may indicate a minimal difference between the first light scene ls1 and the second light scene ls2. The processor 106 may be configured to perform the mapping such that the level of difference between the first light scene ls1 and the second light scene ls2 is minimized. In the example of FIG. 2a, the difference value is indicative of a low contrast between the first light scene ls1 and the second light scene ls2. In another example, the target level of difference may indicate a maximal difference between the first light scene ls1 and the second light scene ls2, and the processor 106 may perform the mapping such that the level of difference between the first light scene ls1 and the second light scene ls2 is maximized. In the example of FIG. 2*b*, the difference value is indicative of a high contrast between the first light scene ls1 and the second light scene ls2.

The processor 106 is further configured to map the second light settings s1, s2, s3 onto the plurality of lighting units 110, 112, 114 based on the difference value, the one or more first light property values of respective first light settings f1, f2, f3 and the one or more second light property values of respective second light settings s1, s2, s3, such that a level of difference between the first light scene ls1 and the second light scene ls2 corresponds to the target level of difference. The processor 106 may determine the mapping of the second light scene ls2 onto the plurality of lighting units 110, 112, 114 by analyzing the first and second light settings of their respective light scenes, to determine differences (and/or commonalities) between the first light settings f1, f2, f3 and the second light settings s1, s2, s3. The mapping of the second light settings s1, s2, s3 may then be based on these differences and based on the difference value. The processor 106 may determine the mapping such that the sum of the differences between the first light settings f1, f2, f3 and the second light settings s1, s2, s3 corresponds to the target level of difference when the second light settings s1, s2, s3 are mapped onto the lighting units. The processor 106 may for example determine the differences between the first light settings f1, f2, f3 and the second light settings s1, s2, s3 by determining distances between the light settings in a color space (e.g. the CIE color space), and determine the mapping such that the sum of the distances corresponds to the target level of difference (e.g. such that they are minimized or maximized).

Referring again to FIG. 2*a*, the difference value may be indicative of a low contrast between the first light scene ls1 and the second light scene ls2. The target level of difference may be a lowest possible contrast between the light scenes. The processor 106 may calculate the distances between the different light settings and determine the mapping such that a sum of the distances between the light settings is minimized, as indicated by the dotted lines in FIG. 3. The processor 106 may, for example, apply a minimization function for a certain color space (e.g. CIEXYZ, CIELAB, CIELUV etc.) and map the second light settings to the lighting units 110, 112, 114 such that the overall Euclidean distance is minimized. As a result, the processor 106 may associate second light setting s1 with the lighting unit 112 with which first lighting unit f2 was associated, associate second light setting s2 with the lighting unit 114 with which first lighting unit f3 was associated and associate second light setting s3 with the lighting unit 110 with which first lighting unit f1 was associated (as illustrated in FIG. 2*a*).

Referring to FIG. 2*b*, the difference value may be indicative of a higher contrast between the first light scene ls1 and the second light scene ls2 as compared to the difference value of FIG. 2*a*. The processor 106 may calculate the distances between the different light settings and determine the mapping such that a sum of the distances between the light settings is larger (e.g. maximized), as indicated by the solid lines in FIG. 3. The processor 106 may, for example, apply a maximization function for a certain color space (e.g. CIEXYZ, CIELAB, CIELUV etc.) and map the second light settings to the lighting units 110, 112, 114 such that the overall Euclidean distance is maximized. As a result, the processor 106 may associate second light setting s1 with the lighting unit 114 with which first lighting unit f3 was associated, associate second light setting s2 with the lighting unit 112 with which first lighting unit f2 was associated and associate second light setting s3 with the lighting unit 110 with which first lighting unit f1 was associated (as illustrated in FIG. 2*b*).

Figure 3:
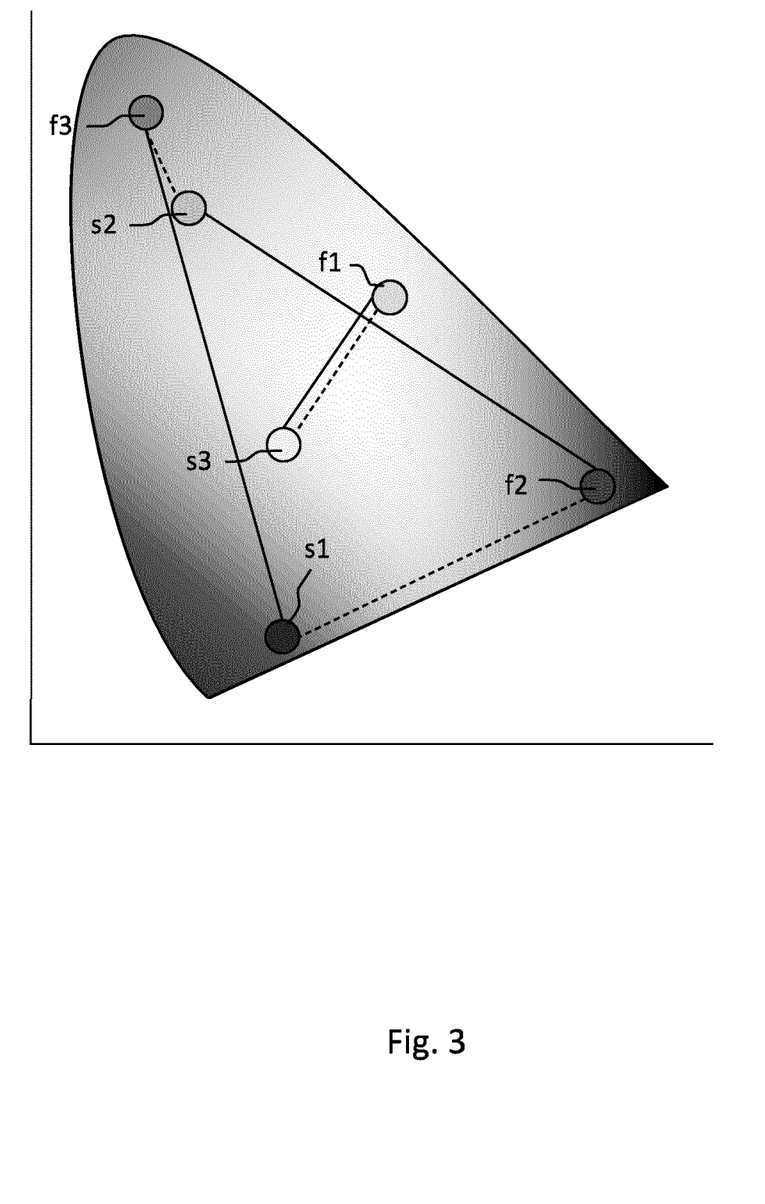
FIG. 3 shows schematically an example of a CIE diagram indicating a plurality of first and second light settings.

It should be understood that determining the differences between the first and the second light settings based on the distances in a color space is just an example, and that the skilled person is able to use different techniques to determine the differences and to determine the mapping without departing form the scope of the appended claims. The examples provided in FIGS. 2*a*, 2*b* and 3 are mere examples, and other light property values may be used additionally or alternatively to determine the mapping of the second light settings. The processor 106 may, for example, determine the mapping based on differences in intensity of the first and second light settings to meet the target level of difference. The processor 106 may, for example, compare intensity values of the first and second light settings, calculate differences between the intensities of the first light settings and the second light setting, and determine the mapping of the second light settings such that the target level of difference is achieved. For instance, if the target level of difference is low, second light settings will be mapped onto lighting units which are associated with first light settings that have similar intensities. The processor 106 may determine the mapping such that the sum of the differences corresponds to the target level of difference. The higher the target level of difference, the higher the sum. Similarly, the processor 106 may use RGB values to calculate the differences between the first light settings and the second light settings to determine the mapping. Similarly, the processor 106 may, for example, determine the mapping based on different beam shapes, sizes and/or directions of the first and second light settings to meet the target level of difference. If, for example, the target level of difference indicates a minimal difference between the first light scene and the second light scene, the processor 106 may associate second light settings with respective lighting units which has been associated with respective first light settings that had similar shapes, sizes and/or directions as the respective second light settings.

The processor 106 may be further configured to determine the mapping based on weights of different light property values. A first light property value (e.g. color) may have a higher weight compared to a second property value (e.g. intensity), and the processor may apply these weights when determining the mapping (e.g. by applying these weights when calculating the Euclidean distances).

The number of second light settings s1, s2, s3 of the second light scene ls2 may be the same as the number of lighting units 110, 112, 114, as illustrated in FIGS. 2*a* and 2*b*. Alternatively, the number of second light settings may be different from the number of number of lighting units 110, 112, 114. If the number of second light settings is higher than the number of lighting units 110, 112, 114, the processor 106 may for example select a subset of the second light settings such that a level of difference between the first light scene and the second light scene corresponds to the target level of difference. The processor 106 may, for example, use the above-mentioned techniques for comparing differences between the first light settings and the second light settings to select the subset such that the level of difference between the first light scene and the second light scene corresponds to the target level of difference. The processor 106 may, for instance, calculate a Euclidean distance that corresponds to the target level of difference, or the processor 106 may select the second light settings such that the sum of the differences between the first light settings and the selected second light settings corresponds to the target level of difference selecting. If the number of second light settings is lower than the number of lighting units 110, 112, 114, the processor 106 may map the available second light settings such that the level of difference between the first light scene and the second light scene corresponds to (or approaches) the target level of difference. The processor 106 may be further configured to control the plurality of lighting units 110, 112, 114 to transition from the first light settings to the mapped second light settings. This has been illustrated in FIGS. 2a and 2b. Additionally or alternatively, the processor 106 may be further configured to store mapping information of the mapping of the second light settings onto the plurality of lighting units in a memory, for instance in local memory 108 or in remote memory 118. The mapping information may be later retrieved by the processor 106 of the controller, or by a (further) lighting controller, such that the transition from the first light scene ls1 to the second light scene ls2 can be executed at a later moment in time.

The lighting units 110, 112, 114 comprise one or more (LED) light sources. The lighting units 110, 112, 114 may be light bulbs, light strips, TLEDs, light tiles, etc. The lighting units 110, 112, 114 may comprise a control unit, such as a microcontroller (not shown), for controlling the light output generated by the one or more light sources (e.g. an LED light source) based on received lighting control commands (which may be based on the light settings/light scenes, which may be received from the controller 102). A lighting control command may comprise lighting control instructions for controlling the light output, such as the color, intensity, saturation, beam size, beam shape, etc. of the one or more light sources.

The controller 102 may be comprised in any type of lighting control device. The controller 102 may, for example, be comprised in a mobile device (e.g. a smartphone, a wearable device, a (tablet) pc, etc.), in a central lighting controller (e.g. a bridge, a router, a central home controller, a smart voice assistant, etc.), a remote server connected to the lighting units 110, 112, 114 and/or the memory 118 via a network/the internet, etc.

The controller 102 may comprise a communication unit 104. The communication unit 104 may be configured to communicate lighting control commands via any wired or wireless communication protocol (e.g. Ethernet, DALI, Bluetooth, Wi-Fi, Li-Fi, Thread, ZigBee, etc.) to the lighting units 110, 112, 114, either directly or indirectly. Additionally or alternatively, the communication unit 104 may be configured to communicate with remote memory 118. The communication unit 104 may be further configured to obtain the data indicative of the first light scene ls1 from a remote source (e.g. via the internet, via a local network, etc.). Additionally or alternatively, the communication unit 104 may be further configured to obtain the data indicative of the second light scene ls2 from a remote source.

The processor 106 may be further configured to receive a signal indicative of an activation of a new (second) light scene ls2. The first light scene ls1 may be a current light scene that is currently active on the lighting units 110, 112, 114 (i.e., the lighting units 110, 112, 114 are controlled according to the light settings of the first light scene). The signal may be received via the communication unit 104, from a software program running on the processor 106 (e.g. a timer that triggers the second light scene ls2), via another input of the processor 106 (e.g. via a user interface or a sensor comprised in the controller 102), etc. A user may, for example, select the subsequent light scene ls2 via a user interface (e.g. by selecting the subsequent light scene via a user interface of a mobile device, by providing a providing a voice input via a voice assistant, by pressing a button on a light switch, etc.). The user interface (or the device comprising the user interface) may provide the signal to the processor 106, either directly or indirectly, for instance via the communication unit 104. Alternatively, a sensor may trigger the subsequent light scene. The sensor may for example, be a temperature sensor that triggers the subsequent light scene when the temperature exceeds a threshold, a presence sensor that triggers the subsequent light scene when presence is detected, a light sensor that triggers the subsequent light scene when the (ambient) light level exceeds a threshold, etc. The sensor may provide the signal to the processor 106, either directly or indirectly, for instance via the communication unit 104.

The second light scene ls2 may have already been mapped onto the plurality of lighting units 110, 112, 114 according to an initial mapping. For instance, second light setting s1 may have already been mapped onto lighting unit 110, second light setting s2 may have already been mapped onto lighting unit 112 and second light setting s3 may have already been mapped onto lighting unit 114. The processor 106 may be configured to obtain the initial mapping (e.g. from memory 108 or 118), and remap the second light settings s1, s2, s3 onto the plurality of lighting units 110, 112, 114 such that the target level of difference between the first light scene ls1 and the second light scene ls2 corresponds to the difference value.

The processor 106 may be further configured to determine a duration for transitioning from the first light settings to the mapped second light settings. The processor 106 may, for example, determine the duration of the transition based on the difference value, the one or more first light property values of respective first light settings and the one or more second light property values of respective second light settings. If the target level of difference cannot be achieved (due to the differences between the first and second light scene), the duration of the transition from the first light settings to the second light settings may be adjusted accordingly (e.g. increased or decreased). By increasing the duration of the transition, the perceived contrast can be decreased, and by decreasing the duration of the transition, the perceived contrast can be increased. The processor 106 may be further configured to determine to what degree (extent) the target level of difference can be achieved based on the differences between the already mapped first and the to-be-mapped second light settings, and the duration may be determined based on the degree that the target level of difference can be achieved. The duration may for example be a function of the degree that the target level of difference can be achieved. Alternatively, the duration may be fixed for a range of degrees, and be adjusted if the degree exceeds a threshold value.

Figure 4:
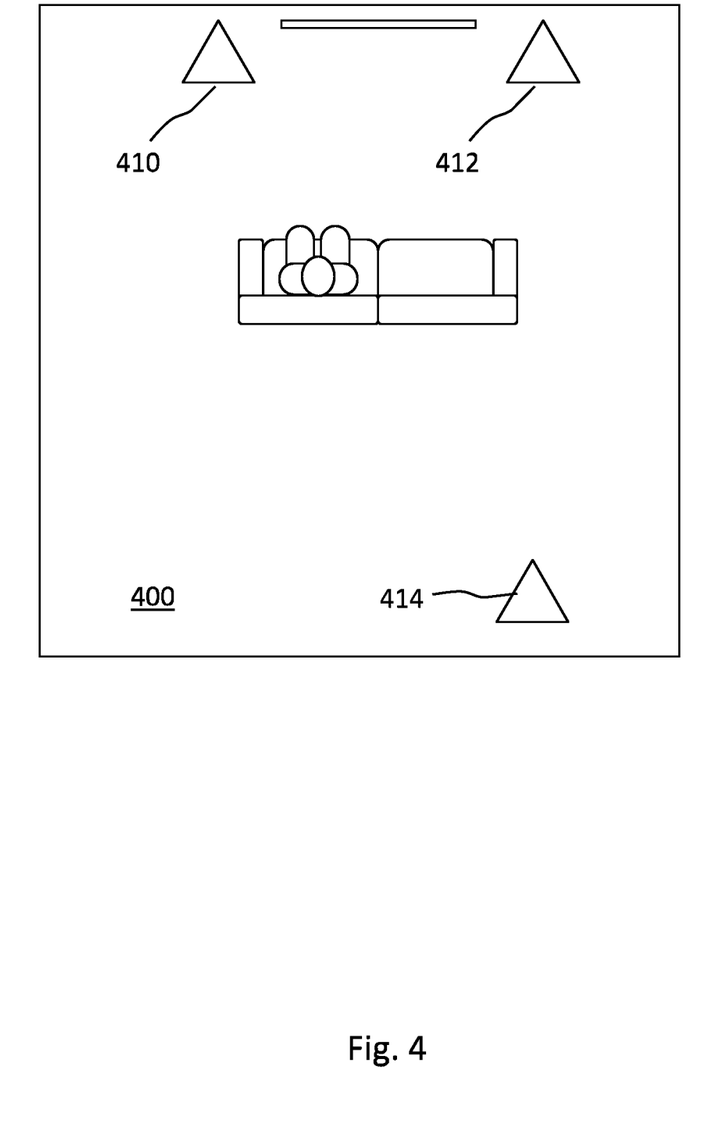
FIG. 4 shows schematically a space comprising a user and a plurality of lighting units.

The processor 106 may be further configured to obtain position information indicative of a location and/or an orientation of a user relative to the plurality of lighting units 110, 112, 114. The processor 106 may for example obtain the location and/or the orientation of the user from a positioning system, from a presence detection system, from the user, from a wearable or mobile user device, etc., or the location and/or the orientation may be a predefined location (e.g. a central point in a room) or a most frequent user location which may have been determined by a learning system. The processor 106 may be further configured to determine the mapping of the second light settings s1, s2, s3 onto the plurality of lighting units 110, 112, 114 based on the location and/or the orientation of the user relative to the plurality of lighting units. The location of a lighting unit (and its light effect) influences how a change from a first light setting to a second light setting is perceived by a user. FIG. 4 illustrates an example wherein a certain lighting unit 414 (or its light effect) is further away from the user compared to the other lighting units 410, 412 in the space 400. Also, the lighting unit 414 is outside the field of view of the user. The processor 106 may then map the second light settings such that less prominent/visible lighting unit 414 contributes less to the target level of difference compared to more prominent/visible lighting units 410, 412.

The difference value may be defined by a user. A user may for instance indicate, via a user interface of a (mobile) device (which may comprise the controller 102), a desired difference value to indicate the target level of difference between the first light scene ls1 and the second light scene ls2. Alternatively, the difference value may be predefined. The difference value may be predefined for a certain transition, for instance when the lighting units 110, 112, 114 transition to a night light scene, the target level of difference between the first light scene ls1 and the second (night) light scene ls2 may be set to "low" to improve the go-to-bed routine for a user. In another example, e.g. when a user switches activities, it may be desirable that the target level of difference between the first light scene ls1 and the second light scene ls2 may be set to "high" to improve the transition from the first activity (e.g. reading) to the second activity (e.g. working out). The difference value may for example be dependent on the context. It may for example be dependent on one or more contextual parameters. Examples of contextual parameters are the time of day, a user's activity, a user's mood, the number and/or identity of people present in the space, etc.

The processor 106 may be configured to determine an activity of a user in the space when the second light scene is activated or when the second light scene is to be activated, and to determine the difference value based on the activity of the user. The activity of the user may be determined based on one or more signals indicative thereof. The processor 106 may receive these signals from an activity detection system (e.g. a video or audio analysis system that analyses video and/or audio to determine a current activity of the user, one or more sensor systems for detecting the activity of the user, etc.). Alternatively, the activity may be determined based on the status of devices (e.g. media devices, kitchen appliances, personal mobile devices, etc.) in the space and/or based on which applications are running on these devices. Alternatively, a user may provide information about a current activity, for instance via a user interface. Techniques for activity detection are known in the art and will therefore not be discussed in detail. If, for example, the user is listening to music, the target level of difference may be higher compared to when a user is reading a book, because the user may not want to be disturbed. If, for example, the user is working on a personal computer, the target level of difference may be lower compared to when a user is playing a game on the personal computer.

The processor 106 may be further configured to obtain a time of day when the second light scene is activated or when the second light scene is to be activated. The time of day may be obtained from an internal or external clock. The processor 106 may be further configured to determine the difference value based on the time of day. For instance, in the morning when the user has to wake up, the target level of difference may be higher than in the evening when the user wishes to relax.

Figure 5:
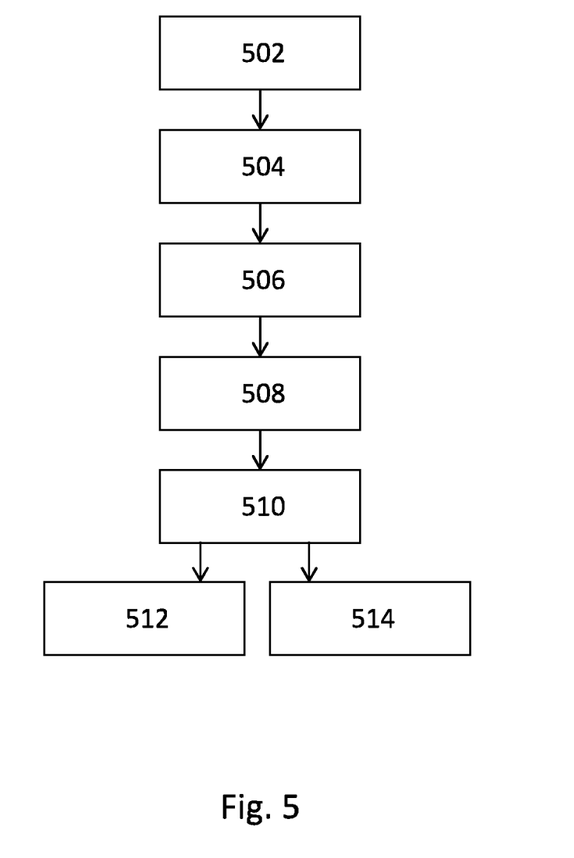
FIG. 5 shows schematically a method of mapping a second light scene onto a plurality of lighting units.

FIG. 5 shows schematically a method 500 of mapping a second light scene onto a plurality of lighting units 110, 112, 114. The method 500 comprises: receiving 502 data indicative of a first light scene, the first light scene comprising a plurality of first light settings for the plurality of lighting units, the data further comprising information indicative of which first light setting is mapped onto which lighting unit of the plurality of lighting units, analyzing 504 the first light settings of the first light scene to determine one or more first light property values of one or more respective first light settings, analyzing 506 second light settings of the second light scene to determine one or more second light property values of one or more respective second light settings, obtaining 508 a difference value, the difference value being indicative of a target level of difference between the first light scene and the second light scene, mapping 510 the second light settings onto the plurality of lighting units based on: the difference value, the one or more first light property values of respective first light settings and the one or more second light property values of respective second light settings, such that a level of difference between the first light scene and the second light scene corresponds to the target level of difference, and controlling 512 the plurality of lighting units to transition from the first light settings to the mapped second light settings and/or storing 514 mapping information of the mapping of the second light settings onto the plurality of lighting units in a memory.

The method 500 may be executed by computer program code of a computer program product when the computer program product is run on a processing unit of a computing device, such as the processor 106 of the controller 102.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors or even the 'cloud'.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of mapping a second light scene onto a plurality of lighting units of a lighting system in a space, the method comprising:
   receiving data indicative of a first light scene, the first light scene comprising a plurality of first light settings for the plurality of lighting units, the data further comprising information indicative of which first light setting is mapped onto which lighting unit of the plurality of lighting units,
   analyzing the first light settings of the first light scene to determine one or more first light property values of one or more respective first light settings,
   analyzing second light settings of the second light scene to determine one or more second light property values of one or more respective second light settings,
   obtaining a difference value, the difference value being indicative of a target level of difference between the first light scene and the second light scene,
   mapping the second light settings onto the plurality of lighting units based on:
   the difference value, the one or more first light property values of respective first light settings and the one or more second light property values of respective second light settings, such that a level of difference between the first light scene and the second light scene, corresponds to the target level of difference, and
   controlling the plurality of lighting units to transition from the first light settings to the mapped second light settings and/or storing mapping information of the mapping of the second light settings-onto the plurality of lighting units in a memory.

2. The method of claim 1, wherein the first light scene is a current light scene, and wherein the second light scene is a new light scene, and wherein the method comprises:
   receiving a signal indicative of an activation of the subsequent light scene.

3. The method of claim 1, wherein the target level of difference indicates a minimal difference between the first light scene and the second light scene, and wherein the mapping is performed such that the level of difference between the first light scene and the second light scene is minimized.

4. The method of claim 1, wherein the target level of difference indicates a maximal difference between the first light scene and the second light scene, and wherein the mapping is performed such that the level of difference between the first light scene and the second light scene is maximized.

5. The method of claim 1, wherein the method further comprises:
   obtaining an initial mapping of the second light settings onto the plurality of lighting units, and wherein the step of mapping the second light settings comprises remapping the second light settings onto the plurality of lighting units such that the target level of difference between the first light scene and the second light scene corresponds to the difference value.

6. The method of claim 1, further comprising:
   determining a duration for transitioning from the first light settings to the mapped second light settings based on the difference value, the one or more first light property values of respective first light settings and the one or more second light property values of respective second light settings.

7. The method of claim 1, further comprising:
   obtaining position information indicative of a location and/or an orientation of a user relative to the plurality of lighting units, and wherein the mapping of the second light settings onto the plurality of lighting units is further based on the location and/or the orientation of the user relative to the plurality of lighting units.

8. The method of claim 1, wherein the difference value is defined by a user, or wherein the difference value is predefined.

9. The method of claim 1, further comprising:
   determining an activity of a user in the space when the second light scene is activated or when the second light scene is to be activated, and
   determining the difference value based on the activity of the user.

10. The method of claim 1, further comprising:
    obtaining a time of day when the second light scene is activated or when the second light scene is to be activated, and
    determining the difference value based on the time of day.

11. The method of claim 1, wherein the first and second light property values are indicative of color points and/or intensity values of the respective light settings.

12. The method of claim 1, wherein the first and second light property values are indicative of properties of the beam shape, size and/or direction of the respective light settings.

13. A computer program product for a computing device, the computer program product comprising computer program code to perform the method of claim 1 when the computer program product is run on a processing unit of the computing device.

14. A controller for mapping a second light scene onto a plurality of lighting units of a lighting system in a space, the controller comprising a processor configured to:
    receive data indicative of a first light scene, the first light scene comprising a plurality of first light settings for the plurality of lighting units, the data further comprising information indicative of which first light setting is mapped onto which lighting unit of the plurality of lighting units,
    analyze the first light settings of the first light scene to determine one or more first light property values of one or more respective first light settings,
    analyze second light settings of the second light scene to determine one or more second light property values of one or more respective second light settings,
    obtain a difference value, the difference value being indicative of a target level of difference between the first light scene and the second light scene,
    map the second light settings onto the plurality of lighting units based on:
    the difference value, the one or more first light property values of respective first light settings and the one or more second light property values of respective second light settings, such that a level of difference between the first light scene and the second light scene corresponds to the target level of difference, and
    control the plurality of lighting units to the mapped second light settings and/or store mapping information of the mapping of the second light settings-onto the plurality of lighting units in a memory.

* * * * *